United States Patent Office 3,517,019
Patented June 23, 1970

3,517,019
CERTAIN 2-SUBSTITUTED AMINO
QUINOLIZINIUM COMPOUNDS
Robert James Alaimo, Norwich, N.Y., assignor to
The Norwich Pharmacal Company, a corporation
of Delaware
No Drawing. Filed Aug. 21, 1967, Ser. No. 662,192
Int. Cl. C07d 31/42, 31/50
U.S. Cl. 260—294.8
33 Claims

ABSTRACT OF THE DISCLOSURE

A series of 2-substituted quinolizinium compounds of the formula:

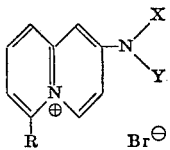

wherein R is hydrogen or methyl; X is hydrogen, ethoxyethyl, amino or allyl; Y is hydrogen, ethoxyethyl, 2-(5-ethyl-2-pyridyl)ethyl, allyl or

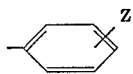

in which is 2-lower alkoxy, 3,4-dimethoxy, 4-dilower-alkylamino, 4-methylmercapto, 2,4-dimethoxy, 4-lower alkoxy, 4-allyloxy, 4-propynyloxy, 3,4-dimethyl, 2-methoxy-5-methyl, hydrogen, 2,4,6-trimethoxy, 4-phenoxy, 4-methoxy-2-methyl, 3-chloro, 3-(1-hydroxyethyl), 4-bromo, 5-chloro-2,4-dimethoxy, 2,5-diethoxy or 4-cyclopentyloxy are anthelmintic agents.

This invention relates to a series of 2-substituted quinolizinium compounds of the formula:

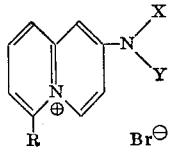

wherein R is hydrogen or methyl; X is hydrogen, ethoxyethyl, amino or allyl; Y is hydrogen, ethoxyethyl, 2-(5-ethyl-2-pyridyl)ethyl, allyl or

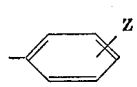

in which Z is 2-lower alkoxy, 3,4-diamethoxy, 4-lower dialkylamino, 4-methylmercapto, 2,4-dimethoxy, 4-lower alkoxy, 4-allyloxy, 4-propynyloxy, 3,4-dimethyl, 2-methoxy-5-methyl, hydrogen, 2,4,6-trimethoxy, 4-phenoxy, 4-methoxy-2-methyl, 3-chloro, 3-(1-hydroxyethyl), 4-bromo, 5-chloro-2,4-dimethoxy, 2,5-diethoxy or 4-cyclopentyloxy, and the hydrobromide salts thereof.

These compounds are effective anthelmintic agents. When administered perorally to mice lethally infected with *Ascaris lumbricoides suum* protection against mortality is secured. Such administration of dosages of these compounds within the range of 50–300 mg./kg. by gavage or via the feed supply of the mice effects a survival of from 50–100%. In swine similarly infected and similarly treated, protection against morbidity and mortality is likewise obtained.

The 2-substituted quinolizinium compounds of this invention are readily prepared. It is presently preferred to obtain them by a reaction which is succinctly represented in this fashion:

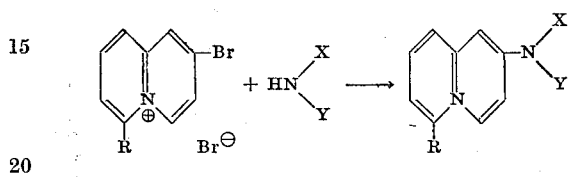

wherein the symbols R, X and Y have the significance previously ascribed. Thus, in accordance with this scheme, the 2-bromoquinolizinium bromide and the appropriate amine are brought together to yield the desired 2-substituted quinolizinium compound. In carrying out this reaction a solvent inert to the reactants is preferably employed. Preferred solvents for this purpose are the alkanols such as ethanol and isopropanol. The reaction is advantageously conducted under the influence of heat and for a time period sufficient to secure maximum yield of end product.

In order that this invention may be fully available to and understood by those skilled in the art the following examples are set forth:

EXAMPLE I

2-{1-[2-(5-ethyl-2-pyridyl)ethyl] hydrazino}
quinolizinium bromide hydrobromide

To a solution of 2-bromoquinolizinium bromide (17.0 g., 0.06 mole) in ethanol (400 ml.) was added 2-(5-ethyl-2-pyridyl)ethyl hydrazine (prepared by reacting 5-ethyl-2-vinylpyridine and hydrazine hydrate) (12.0 g., 0.07 mole) and the mixture was boiled under reflux for 4.5 hours. The solution was then concentrated in vacuo to about 200 ml. and product precipitated with ether/acetone. The product (22.0 g., 82) melted at 247–248°.

Anal.—Calcd. for $C_{18}H_{21}BrN_4 \cdot HBr$ (percent): C. 47.59; H, 4.88; Br, 35.19. Found (percent): C, 47.30; H, 4.93; Br, 3490.

EXAMPLE II 2-(p-anisidino)-6-methylquinolizinium bromide
hemihydrobromide

To a solution of 2-bromo-6-methylquinolizinium bromide (41.0 g., 0.14 mole) is isopropanol (700 ml.) was added p-anisidine (25.0 g., 0.20 mole). The stirred mixture was boiled under reflux for 3.5 hours. Cooling of the mixture in an ice bath along with vigorous scratching caused precipitation to occur. The yellow product was removed by filtration, washed with ether and air dried. The product (43.0 g., 83%) was recrystallized from isopropanol/ether to give yellow needles which melted at 189–191°. Addition of 48% HBr insures retention of the hydrobromide during recrystallization.

*Anal.*—Calcd. for $C_{17}H_{17}BrN_2O \cdot 1/2HBr$ (percent): C, 52.93 H, 4.57; Br, 31.08. Found (percent): C, 52.95; H, 4.61; Br, 30.95.

EXAMPLE III

2-[bis(2-ethoxyethyl)amino] quinolizinium bromide

To a solution of 2-bromoquinolizinium bromide (3.0 g., 0.010 mole) in ethanol (75 ml.) was added bis β-ethoxy-ethyl)amine (3.0 g., 0.019 mole). The stirred mixture was boiled under reflux for 2.5 hours. Treatment of the cooled reaction mixture with ether precipitated a solid (3.5 g., 92%). The product was recrystallized from ether/ethanol to give crystals which melted at 103–104°.

*Anal.*—Calcd. for $C_{17}H_{25}BrN_2O_2$ (percent): C, 55.28; H, 6.82; Br, 21.64. Found (percent): C, 55.21; H, 7.14; Br, 21.64.

EXAMPLE IV

2-(3,4-dimethoxyanilino)-6-methylquinolizinium bromide

To a solution of 2-bromoquinolizinium bromide (10.0 g., 0.03 mole) in isopropanol (200 ml.) was added 4-aminoveratrole (7.0 g., 0.05 mole). The stirred mixture was boiled under reflux for 0.5 hour. At this time, the previously clear, dark solution began to precipitate yellow solid. The heating was continued for an additional 2 hours, then the solution was cooled and filtered. After washing the solid with ether, it was air dried. The dark yellow product (13.0 g., 100%) was recrystallized from ethanol to give chartreuse colored needles which melted at 241–243°. A second recrystallization from ethanol provided an analytical sample which melted at 244–245°.

*Analysts.*—Calcd. for $C_{18}H_{19}BrN_2O_2$ percent): C, 57.61; H, 5.10; Br, 21.30. Found (percent): C, 57.70; H, 4.90; Br, 21.26.

EXAMPLE V

2-(p-dimethylaminoanilino)quinolizinium bromide hydrobromide

To a solution of 2-bromoquinolizinium bromide (5.0 g., 0.02 mole) in isopropanol (100 ml.) was added N,N-dimethyl-p-phenylene-diamine (3.0 g., 0.02 mole). The stirred mixture was boiled under reflux for 4 hours. Cooling of the solvent in an ice bath with the addition of anhydrous ether precipitated a yellow solid. The solid was removed by filtration and taken up immediately in hot methanol. The methanol solution was treated with ether along with vigorous scratching causing precipitation to occur. The product was removed by filtration, washed with ether and air dried. The product (6.0 g., 82%) was recrystallized sveral times from isopropanol/water, adding 2 ml. 48% HBr, to give green crystals which melted at 227–228°.

*Analysis.*—Calcd. for $C_{17}H_{18}BrN_3 \cdot HBr$ (percent): C, 48.02; H, 4.50; Br, 37.59. Found (percent): C, 47.71; H, 4.87; Br, 37.49.

EXAMPLE VI

6-methyl-2-(4-methylmercaptoanilino)quinolizinium bromide

To a solution of 2-bromo-6-methylquinolizinium bromide (10.0 g., 0.03 mole) in isopropanol (175 ml.) was added 4-methylmercaptoaniline (6.5 g., 0.05 mole). The stirred mixture was boiled under reflux with stirring for 3 hours. Cooling of the solution in an ice bath along with vigorous scratching caused precipitation to occur. The product was removed by filtration, washed with ether and air dried. The product (9.0 g., 76%) was recrystallized from isopropanol to give crystals which melted at 227–229°.

*Analysis.*—Calcd. for $C_{17}H_{17}BrN_2S$ (percent): C, 56.51; H, 4.74; Br, 22.12. Found (percent): C, 56.65; H, 4.61; Br, 22.07.

EXAMPLE VII

6-methyl-2-(p-phenetidino)quinolizinium bromide

To a solution of 2-bromo-6-methylquinolizinium bromide (26.0 g., 0.09 mole) in isopropanol (500 ml.) was added p-phenetidine (13.0 g., 0.10 mole). The stirred mixture was boiled under reflux for 4 hours. Cooling of the mixture in an ice bath along with vigorous scratching caused precipitation to occur. The yellow solid was removed by filtration, washed with ether and air dried. The product (31.0 g., 100%) was recrystallized from isopropanol/ether to give crystals which melted at 185–188°. A second recrystallization from isopropanol/ether provided needles which melted at 188–189°.

*Analysis.*—Calcd. for $C_{18}H_{19}BrN_2O$ (percent): C, 60.17; H, 5.33; Br, 22.25. Found (percent): C, 60.29; H, 5.24; Br, 22.36.

EXAMPLE VIII

2-(diallylamino)-6-methylquinolizinium bromide

To a solution of 2-bromo-6-methylquinolizinium bromide (35.0 g., 0.12 mole) in isopropanol (500 ml.) was added diallylamine (18.0 g., 0.19 mole). The stirred mixture was boiled under reflux for 5 hours. The hot solution was treated with charcoal and filtered. The reaction mixture was then cooled in ice and treated with about 1 liter of ether along with vigorous scratching. The precipitated product was removed by filtration and washed with ether. The product (32.0 g., 87%) was recrystallized from isopropanol/ether to give needles which melted at 107–109°.

*Analysis.*—Calcd. for $C_{16}H_{19}BrN_2$ (percent): C, 60.19; H, 6.00; Br, 25.03. Found (percent): C, 60.06; H, 6.08; Br, 25.02.

EXAMPLE IX

2-(2,4-dimethoxyanilino)-6-methylquinolizinium bromide tetartohydrobromide

To a solution of 2-bromo-6-methylquinolizinium bromide (10.0 g., 0.03 mole) in isopropanol (200 ml.) was added 2,4-dimethoxyaniline (7.0 g., 0.05 mole). The stirred mixture was boiled under reflux for 5 hours. After cooling the reaction mixture in an ice bath, it was vigorously scratched and treated with small quantities of dry ether. The dark yellow solid which precipitated was removed by filtration, washed with ether and finally air dried. The crude product (12.0 g., 92%) melted at 224–227°. It was purified by recrystallization from isopropanol/ether, adding 48% HBr, to yield crystals which melted at 229–232°.

*Analysis.*—Calcd. for $C_{18}H_{19}BrN_2O_2 \cdot 1/4 \, HBr$ (percent): C, 54.66; H, 4.91; N, 7.08; Br, 25.26. Found (percent): C, 54.34; H, 4.89; N, 7.27; Br, 25.78.

EXAMPLE X

2-(o-anisidino)quinolizinium bromide

To a solution of 2-bromoquinolizinium bromide (30.0 g., 0.1 mole) in isopropanol (500 ml.) was added o-anisidine (24.0 g., 0.2 mole). The stirred mixture was boiled under reflux for 4.5 hours. The reaction mixture was then chilled in an ice bath and vigorously scratched. After several minutes precipitation began and the mixture became thick with solids. The product was removed by filtration and washed with ether. After drying at 63° for several hours the product weighed 28.0 g. (82%). Recrystallization from isopropanol/ether provided needles which melted at 182–183°.

*Analysis.*—Calcd. for $C_{16}H_{15}BrN_2O$ (percent): C, 58.02; H, 4.56; Br, 24.13. Found (percent): C, 58.30; H, 4.77; Br, 24.16.

EXAMPLE XI

2-(p-phenetidino)quinolizinium bromide

To a solution of 2-bromoquinolizinium bromide (25.0 g., 0.09 mole) in isopropanol (500 ml.) was added p-phenetidine (18.0 g., 0.15 mole). The stirred mixture was boiled under reflux for 4.5 hours. The reaction mixture was then chilled in an ice bath, treated with acetone/ether and vigorously scratched until crystallization began. After standing overnight in the cold, the product was removed by filtration, washed with ether and air dried. The solid weighed 26.0 g. (88%). Recrystallization from isopropanol/ether followed by ethanol/ethyl acetate yielded crystals which melted at 172–174°.

*Analysis.*—Calcd. for $C_{17}H_{17}BrN_2O$ (percent): C, 59.14; H, 4.96; Br, 23.15. Found (percent): C, 59.01; H, 5.06; Br, 22.91.

EXAMPLE XII 2-(p-allyloxyanilino)quinolizinium bromide tetartohydrobromide (A) p-Allyloxyaniline.—To 10% HCl (1000 ml.) was added p-allyloxyacetanilide (72.0 g., 0.4 mole). The stirred mixture was boiled under reflux for 1.5 hours. The mixture was cooled and the HCl salt of the aniline precipitated from solution (40.0 g., 72%). Treatment of an aqueous solution (200 ml.) of the p-allyloxyaniline hydrochloride (30.0 g., 0.16 mole) with approximately 100 ml. of 10% aqueous sodium hydroxide yielded the free base. The aqueous solution was extracted with ether (3×75 ml.) and the combined extracts were dried over anhydrous potassium carbonate. Removal of the solvent in vacuo gave a brown oily liquid (22.0 g., 92%) which was used in Part B without purification.

(B) 2 - (p - allyloxyanilino)quinolizinium bromide tetartohydrobromide.—To a solution of 2-bromoquinolizinium bromide (25.0 g., 0.09 mole) in isopropanol (350 ml.) was added p-allyloxyaniline (20.0 g., 0.13 mole). The stirred mixture was boiled under reflux for 3.5 hours. The reaction mixture was cooled and treated wih acetone/ether to induce crystallization. After standing overnight in the cold, filtration gave 27.0 g. (83%) of a yellow solid. Recrystallization from isopropanol/ether (48% HBr) provided crystals which melted at 143–144°.

*Analysis.*—Calcd. for $C_{18}H_{17}BrN_2 \cdot 1/4$ HBr (percent): C, 57.25; H, 4.61; N, 7.42; Br, 26.48. Found (percent): C, 56.54; H, 4.66; N, 6.98; Br, 26.45.

EXAMPLE XIII 2-(p-diethylaminoanilino)quinolizinium bromide hydrobromide hemihydrate To a solution of 2-bromoquinolizinium bromide (6.0 g., 0.02 mole) in isopropanol (200 ml.) was added N,N-diethyl-p-phenylenediomine (5.0 g., 0.03 mole). The stirred mixture was boiled under reflux for 4.5 hours. The mixture was cooled in an ice bath and filtered. The brown solid (4.0 g., 42%) melted at 197–202°. Recrystallization from ethanol/48% HBr provided crystals which melted at 220–224°.

*Analysis.*—Calcd. for $C_{19}H_{22}BrN_3 \cdot HBr \cdot 1/2\ H_2O$ (percent): C, 49.37; H, 5.23; N, 9.09; Br, 34.58. Found (percent): C, 49.60; H, 5.48; N, 9.01; Br, 35.27.

EXAMPLE XIV 2-(p-propargyloxyanilino)quinolizinium bromide (A) p-Propargyloxyacetanilide.—To a solution of p-hydroxyacetanilide (50.0 g., 0.33 mole) in acetone (350 ml.) was added anhydrous potassium carbonate (50.0 g.) and propargylbromide (40.0 g., 0.35 mole). The stirred mixture was boiled under reflux for 8.0 hours and then allowed to cool overnight at room temperature. The solvent was removed in vacuo and the residue was treated with water. The solid material insoluble in water was removed by filtration and washed with petroleum ether. After having dried at 63°, the material weighed 63.0 g. It was used in Part B without further purification.

(B) p-Propargyloxyaniline.—(1) A solution of p-propargyloxyacetaniline (63.0 g., 0.33 mole) in 10% hydrochloric acid (600 ml.) was stirred at 100° for 2.75 hours. The solution was removed from the heat and chilled in an ice bath for 2.0 hours. The solid was removed by filtration and washed with petroleum ether. After drying at 63°, the product weighed 27.0 g. (44%).

(2) To a solution of p-propargyloxyaniline hydrochloride (15.0 g., 0.08 mole) in water (250 ml.) was added 10% aqueous sodium hydroxide solution (50 ml.) until the solution was strongly basic. The solution was then extracted with ether (500 ml.) total and the organic layers were dried over anhydrous potassium carbonate. The solvent was removed in vacuo leaving a yellow-brown residual liquid weighing 12.0 g. (100%) which was used in Part C without further purification.

(C) 2 - (p - propargyloxyanilino)quinolizinium bromide.—To a solution of 2-bromoquinolizinium bromide (22.0 g., 0.76 mole) in isopropanol (450 ml.) was added p-propargyloxyaniline (12.0 g., 0.095 mole). The stirred mixture was boiled under reflux for 4.0 hours. The precipitate formed during refluxing was removed by filtration and the supernatant liquid was treated with ether to provide a total yield of 26.0 g. (96%) of a yellow powder. Recrystallization from ethanol provided crystals melting at 189–191°.

*Analysis.*—Calcd. for $C_{18}H_{15}BrN_2O$ (percent): C, 60.80; H, 4.25; N, 7.88; Br, 22.49. Found (percent): C, 60.29; H, 4.25; N, 7.92; Br, 22.43.

EXAMPLE XV 2-(3,4-dimethylanilino)quinolizinium bromide

To a solution of 2-bromoquinolizinium bromide (300 g., 0.1 mole) in isopropanol (600 ml.) was added 3,4-dimethylaniline (18.0 g., 0.15 mole). The mixture was stirred and boiled under reflux for 4.25 hours. The mixture was poured into a beaker, chilled in an ice bath, and scratched until crystallization occured. The product was removed by filtration and washed with ether. After drying at 63°, the yellow product weigherd 32.0 g. (97%). Recrystallization from isopropanol provided crystals melting at 235–237°.

*Analysis.*—Calcd. for $C_{17}H_{17}BrN_2$ (percent): C, 62.01; H, 5.21; N, 8.51; Br, 24.27. Found (percent): C, 61.53; H, 4.92; N, 8.50; Br, 24.06.

EXAMPLE XVI 2-(2,4-dimethoxyanilino)quinolizinium bromide hemihydrobromide

To a solution of 2-bromoquinolizinium bromide (10.0 g., 0.035 mole) in isopropanol (200 ml.) was added 2,4-dimethoxyaniline (6.0 g., 0.039 mole). The stirred mixture was boiled under reflux for 4.75 hours. The reaction mixture was cooled and treated with ether/acetone to induce crystallization. The product (10.0 g., 72%) was removed by filtration and washed with ether. Recrystallization from isopranpanol/ether/48% HBr provided crystals which melted at 217–219°.

*Analysis.*—Calcd. for $C_{17}H_{17}BrN_2O_2 \cdot 1/2HBr$ (percent): C, 50.83; H, 4.39; N, 6.98; Br, 29.84. Found (percent): C, 51.14; H, 4.16; N, 7.16; Br, 31.04.

EXAMPLE XVII 2-anilinoquinolizinium bromide

To a solution of 2-bromoquinolizinium bromide (30.0 g., 0.1 mole) in isopropanol (600 ml.) was added aniline (17 g., 0.08 mole). The mixture was stirred and boiled under reflux for 4.5 hours. The reaction mixture was allowed to crystallize at room temperature. The product was removed by filtration and washed with ether. After drying at 63° for several days, the crystals weighed 24.0 g. Recrystallization from isopropanol provided crystals melting at 175–179° C.

*Analysis.*—Calcd. for $C_{15}H_{13}BrN_2$ (percent): C, 59.81; H, 4.35; N, 9.30; Br, 26.53. Found (percent): C, 59.03; H, 4.44; N, 9.46; Br, 26.35.

EXAMPLE XVIII 2-(2,4,6-trimethoxyanilino)quinolizinium bromide

To 2-bromoquinolizinium bromide (12.0 g., 0.04 mole) was added an isopropanol solution of 2,4,6-trimethoxyaniline (8.6 g. in 300 ml.). The stirred mixture was boiled under reflux for 4.5 hours. After cooling to room temperature, the reaction mixture was chilled in an ice bath and 5.0 g. of unreacted starting material precipitated from solution and was removed by filtration. The supernatant solution was treated with ether and allowed to stand overnight producing 10.0 g. (62%) of material, which was removed by filtration. Recrystallization from isopropanol and small amounts of water produced crystals melting at 241–242°.

*Analysis.*—Calcd. for $C_{18}H_{19}BrN_2O_3$ (percent): C, 55.20; H, 4.89; N, 7.16; Br, 20.42. Found (percent): C, 55.39; H, 5.00; N, 7.21; Br, 20.31.

EXAMPLE XIX 2-(p-phenoxyanilino)quinolizinium bromide tetartohydrobromide

To a solution of 2-bromoquinolizinium bromide (10.0 g., 0.035 mole) in isopropanol (200 ml.) was added p-phenoxyaniline (7.0 g., 0.038 mole). The stirred mixture was boiled under reflux for 5 hours. The reaction mixture was then cooled in an ice bath and treated with ether/acetone to induce crystallization. The light tan solid (14.0 g., 98%) was removed by filtration and washed with ether. Recrystallization from isopropanol/ether/48% HBr provided a powder which melted at 205–206°.

*Analysis.*—Calcd. for $C_{21}H_{17}BrN_2O \cdot 1/4HBr$ (percent): C, 60.99; H, 4.21; N, 6.78; Br, 24.16. Found (percent): C, 60.60; H, 4.45; N, 6.58; Br, 24.25.

EXAMPLE XX 2-(4-n-butoxyanilino)quinolizinium bromide (A) *p-(n-butoxy)nitrobenzene.*—To a solution of p-nitrophenol (56.0 g., 0.4 mole) in acetone (400 ml.) was added n-butyl bromide (60.0 g., 0.44 mole) and potassium carbonate (anhydrous, 56.0 g., 0.4 mole). The mixture was heated on the steam bath for 48.0 hours. The acetone was removed from the reaction mixture in vacuo. Then water (400 ml.) was added to the residue, which was extracted twice with benzene (200 ml. portions). The benzene layers were washed thrice with 10% sodium hydroxide solution (150 ml. portions). The washed layers of benzene were then dried over anhydrous potassium carbonate and the solvent was removed in vacuo. The product obtained after evaporation of the solvent was a crude yellow liquid (63.0 g., 79%). This was used in Part B without further purification.

(B) *p-(n-butoxy)aniline.*—A solution of p-(n-butoxy)nitrobenzene (18.0 g., 0.09 mole) in isopropanol (200 ml.) was hydrogenated over 50% water wet palladium/charcoal catalyst (3.0 g.). After a pick-up of 28 p.s.i., the hydrogenation was complete and the catalyst was removed by filtration. The isopropanol solution which was calculated to contain 15.0 g. of the aniline was used directly in Part C.

(C) *2-(4-n-butyoxyanilino)quinolizinium bromide.*—To a solution of 2-bromoquinolizinium bromide (25.0 g., 0.085 mole) in isopropanol (550 ml.) was added p-n-butoxyaniline (15.0 g., 0.09 mole). The stirred mixture was boiled under reflux for 3.25 hours. The reaction mixture was cooled at room temperature overnight. The crystals precipitated by cooling were removed by filtration and washed with ether, and the supernatant provided 11.0 g. of product. The total yield was 24.0 g. (75%). Recrystallization from isopropanol provided crystals melting at 221–223°.

*Analysis.*—Calcd. for $C_{19}H_{21}BrN_2O$ (percent): C, 61.13 H, 5.67; N, 7.51; Br, 21.41. Found (percent): C, 61.15; H, 5.65; N, 7.60; Br. 21.24.

EXAMPLE XXI 2-(4-methoxy-2-methylanilino)quinolizinium bromide

To a solution of 2-bromoquinolizinium bromide (20.0 g., 0.07 mole) in isopropanol (550 ml.) was added 4-methoxy-2-methylaniline (14.0 g., 0.1 mole). The mixture was stirred and boiled under reflux for 4.0 hours. The reaction mixture was then chilled in an ice bath and scratched. The product was removed by filtration and washed with ether. After drying at 63°, the yellow product weighed 28.0 g. (88%). Recrystallization from ethanol provided crystals which melted at 259–262°.

*Analysis.*—Calcd. for $C_{17}H_{17}BrN_2O$ (percent): C, 59.14; H, 4.96; N, 8.12; Br, 23.15. Found (percent): C, 58.98; H, 5.10; N, 8.23; Br, 22.96.

EXAMPLE XXII 2-(p-propoxyanilino)quinolizinium bromide (A) *p-Propoxynitrobenzene.*—To a solution of p-nitrophenol (56.0 g., 0.4 mole) and propyl bromide (50.0 g., 0.4 mole) in acetone (400 ml.) was added anhydrous potassium carbonate (56.0 g.). The mixture was boiled under reflux for 48 hours. The solvent was removed in vacuo and to the residue was added water (400 ml.). The aqueous mixture was extracted with benzene (2×200 ml.). The benzene extracts were washed with 10% aqueous sodium hydroxide (3×150 ml.), then dried over anhydrous potassium carbonate. Solvent removal in vacuo left a yellow liquid (53.0 g., 73%) which was used in Part B without purification.

(B) *p-Propoxyaniline.*—A solution of p-propoxynitrobenzene (20.0 g., 0.11 mole) in isopropanol (300 ml.) was hydrogenated over palladium/charcoal catalyst (3.0 g.). The hydrogen uptake (27 p.s.i.) was rapid and the solution was calculated to contain 17.0 g. of p-propoxyaniline. The catalyst was removed by filtration and the solution was used directly in Part C.

(C) *2-(p-propoxyanilino)quinolizinium bromide.*—To the solution from Part B, which was calculated to contain 17.0 g. (0.11 mole) of p-propoxyaniline, was added 2-bromoquinolizinium bromide (16.0 g., 0.055 mole) and enough isopropanol to give a total volume of 600 ml. The stirred mixture was boiled under reflux for 4.5 hours, then cooled and treated with ether. A yellow solid precipitated (20.0 g., 100%) which was removed by filtration and washed with ether. Recrystallization from isopropanol/ether gave a pale yellow powder which melted at 182–184°.

*Analysis.*—Calcd. for $C_{18}H_{19}BrN_2O$ (percent): C, 60.17; H, 5.33; N, 7.80; Br, 22.24. Found (percent): C, 60.32; H, 5.53; N, 7.83; Br, 22.34.

EXAMPLE XXIII 2-(5-chloro-2,4-dimethoxyanilino)quinolizinium bromide

To a solution of 2-bromoquinolizinium bromide (30.0 g., 0.1 mole) in isopropanol (600 ml.) was added 5-chloro-2,4-dimethoxyaniline (28.0 g., 0.15 mole). The mixture was stirred and boiled under reflux for 5.0 hours. The reaction mixture was chilled in an ice bath, whereupon precipitation began. The product was removed by filtration and washed with ether. After drying at 63°, the product weighed 35.0 g., (88%). Recrystallization from ethanol provided the product melting at 260–261°.

*Analysis.*—Calcd. for $C_{17}H_{17}ClBrN_2O_2$ (percent): C, 51.47; H, 4.32; N, 7.06; Br, 20.15; Cl, 8.94. Found (percent): C, 51.49; H, 4.14; N, 7.04; Br, 20.10; Cl, 8.78.

EXAMPLE XXIV

2-[3-(α-hydroxyethyl)anilino]quinolizinium bromide

To a solution of 2-bromoquinolizinium bromide (30.0 g., 0.1 mole) in isopropanol (550 ml.) was added 3-(α-hydroxyethyl)aniline (25.0 g., 0.18 mole). The stirred mixture was boiled under reflux for 4.5 hours. The mixture was cooled in an ice bath, treated with ethyl acetate and vigorously scratched. The product (28.0 g., 78%) was obtained as a powder. Recrystallization from isopropanol/ethyl acetate yielded crystals which melted at 165–167°.

Analysis. — Calcd. for $C_{17}H_{17}BrN_2O$: (percent): C, 59.14; H, 4.96; N, 8.12; Br, 23.15. Found (percent): C, 59.32; H, 5.13; N, 8.07; Br, 23.24.

EXAMPLE XXV 2-(p-bromoanilino)quinolizinium bromide

To an isopropanol solution (200 ml.) of 2 - bromoquinolizinium bromide (10.0 g., 0.035 mole) was added p-bromoaniline (6.5 g., 0.038 mole). The mixture was stirred while boiling under reflux for 4.5 hours. The reaction mixture was chilled in an ice bath and filtered. After washing with ether and drying at 63°, the product weighed 13.0 g. (98%). Recrystallization from isopropan provided needles which melted at 100–101°.

Analysis.—Calcd. for $C_{15}H_{12}Br_2N_2$ (percent): C, 47.40; H, 3.18; N, 7.37; Br, 42.05. Found (percent): C, 46.97; H, 3.44; N, 7.27; Br, 41.89.

EXAMPLE XXVI 2-(2-methoxy-5-methylanilino)quinolizinium bromide

To a solution of 2-bromoquinolizinium bromide (10.0 g., 0.035 mole) in isopropanol (200 ml.) was added 2-methoxy-5-methylaniline (6.0 g., 0.04 mole). The stirred mixture was boiled under reflux for 4.75 hours. The reaction mixture was cooled to room temperature, causing some crystallization, and then refrigerated. The product was removed by filtration and washed with ether. The yellow product weighed 10.0 g. (83%). Recrystallizations from isopropanol and from ethanol/ether provided as an analytical sample pale yellow crystals melting at 248–253°.

Analysis. — Calcd. for $C_{17}H_{17}BrN_2O$ (percent): C, 59.14; H, 4.96; N, 8.12; Br, 23.15. Found (percent): C, 59.16; H, 5.09; N, 8.22; Br, 23.26.

EXAMPLE XXVII 2-(p-isopropoxyanilino)quinolizinium bromide tetartohydrate (A) p-Isopropoxynitrobenzene.—A solution of p-nitrophenol (56.0 g., 0.4 mole), isopropyl bromide (50.0 g., 0.4 mole) and anhydrous potassium carbonate (56.0 g.) in dry acetone (400 ml.) was boiled under reflux for 48 hours on a steam bath. The solvent was removed in vacuo and to the residue was added water (550 ml.) The aqueous mixture was extracted with benzene (3×200 ml. portions). The benzene extracts were combined and washed with 10% aqueous sodium hydroxide (3×150 ml.). The benzene solution was dried over anhydrous potassium carbonate for a short time, then the solvent was removed in vacuo. The crude yellow oil (21.0 g., 29%) was used without purification in Part B.

(B) p-Iospropoxyaniline.—A solution of p-isopropoxynitrobenzene (21.0 g., 0.11 mole) in isopropanol (210 ml.) was hydrogenated over 50% water wet palladium/charcoal catalyst (2.0 g.). The hydrogen uptake was very rapid. After a pick-up of 23 p.s.i., the hydrogenation was complete and the catalyst removed by filtration. The isopropanol solution which was calculated to contain 12.0 g. of the aniline was used directly in Part C.

(C) 2 - (p-isopropoxyanilino)quinolizinium bromide tetartohydrate.—To the isopropanol solution from Part B was added 2-bromoquinolizinium bromide (22.0 g., mole) and additional isopropanol to provide a total volume of 500 ml. The stirred mixture was boiled under reflux for 4.5 hours. After standing overnight in the cold 2-bromoquinolizinium bromide (10.0 g.) had precipitated from solution. Treatment of the supernatant solution with petroleum ether/ethyl ether precipitated a yellow solid (15.0 g.). Recrystallization from ether/isopropanol provided yellow crystals which melted at 183–186°.

Analysis.—Calcd. for $C_{18}H_{19}BrN_2O.1/4H_2O$ (percent): C, 59.43; H, 5.40; N, 7.70; Br, 21.97. Found (percent): C, 59.48; H, 5.59; N, 7.55; Br, 22.14.

EXAMPLE XXVIII 2-(3,4-dimethoxyanilino)quinolizinium bromide

To a solution of 2-bromoquinolizinium bromide (7.0 g., 0.02 mole) in isopropanol (150 ml.) was added 4-aminoveratrole (7.0 g., 0.05 mole). The stirred mixture was boiled under reflux for 5 hours, then allowed to cool in an ice bath. The yellow solid (8.0 g., 92%) was recrystallized from isopropanol/ethanol to provide yellow crystals which melted at 278–280°.

Analysis. — Calcd. for $C_{17}H_{17}BrN_2O_2$ (percent): C, 56.54; H, 4.75; N, 7.76; Br, 23.13. Found (percent): C, 56.66; H, 4.84; N, 7.73; Br, 21.01.

EXAMPLE XXIX 2-(o-phenetidine)quinolizinium bromide

To a solution of 2 - bromoquinolizinium bromide (10.0 g., 0.035 mole) in isopropanol (200 ml.) was added o-phenetidine (10.0 g., 0.07 mole). The stirred mixture was boiled under reflux for 4.0 hours. The reaction mixture was chilled in an ice bath, scratched, and treated with ether and acetone, whereupon it began to boil out of solution, it was decanted to another beaker, scratched and treated with ether again crystallizing out of the solvent. The product was removed by filtration and washed with ether. The light brown solid weighed 12.0 g. (100%) after drying at 63°. Recrystallization from isopropanol/ether provided crystals melting at 177–178°.

Analysis.—Calcd. for $C_{17}H_{17}BrN_2O$ (percent): C, 59.14; H, 4.96; N, 8.12; Br. 23.15. Found (percent): C, 59.04; H, 4.99; N, 7.86; Br, 23.12.

EXAMPLE XXX 2-(2,5-diethoxyanilino)quinolizinium bromide

To a solution of 2-bromoquinolizinium bromide (15.0 g., 0.05 mole) in isopropanol (300 ml.) was added 2,5-diethoxyaniline (15.0 g., 0.08 mole). The stirred mixture was boiled under reflux for 4.5 hours. The reaction mixture was chilled in an ice bath and scratched, crystallization taking place rapidly. The product was removed by filtration and washed with ether, weighing 17.0 g. (85%) after drying at 63°. Recrystallization from isopropanol with a small amount of water added provided crystals melting at 246–248°.

Anaylsis.—Calcd. for $C_{19}H_{21}BrN_2O_2$ (percent): C, 58.62; H, 5.44; N, 7.20; Br, 20.53. Found (percent): C, 58.50; H, 5.46; N, 7.15; Br, 20.77.

EXAMPLE XXXI 2-(p-cyclopentyloxyanilino)quinolizinum bromide tetartohydrobromide (A) p-Cyclopentyloxy-nitrobenzene.—To a solution of sodium p-nitrophenolate (50.0 g., 0.31 mole) in dimethylformamide (200 ml.) was added dropwise bromocyclopentane (50.0 g., 0.033 mole). The stirred mixture was heated at a temperature of 90° C. for 2.5 hours. The solution was cooled to 30° C. and 5% sodium hydroxide aqueous solution (200 ml.) was added. The solution was then extracted twice with benzene, the organic layers were washed with a 10% aqueous sodium hydroxide solution, and then dried over calcium chloride. The benzene was evaporated in vacuo and 46 g. of product were obtained (75%).

(B) p-Cyclopentyloxyaniline.—To a solution of p-cyclopentyloxy-nitrobenzene (21.0 g., 0.1 mole) in isopropanol (250 ml.) was added 5% palladium/charcoal catalyst, and the mixture was hydrogenated acquiring 26 p.s.i. of hydrogen. The catalyst was removed by filtration and the calculated 17.0 g. of the aniline produced was used in Part C without further purification.

(C) 2 - (p - cyclopentyloxyanilino)quinolizinium bromide tetartohydrobromide.—To a solution of 2-bromoquinolizinium bromide (15.0 g., 0.05 mole) in isopropanol (250 ml.) was added p-cyclopentyloxyaniline (17.0 g., 0.10 mole). The stirred mixture was boiled under reflux for 4.0 hours. The reaction mixture was chilled in an ice bath, scratched, and treated with ether. The precipitate was removed by filtration and washed with ether providing a powder weighing 22.0 g. (80%). Recrystallizations from isopropanol and ether, the third with a few ml. of 48% hydrobromic acid, produced a powder melting at 197–199°.

*Analysis.*—Calcd. for $C_{20}H_{21}BrN_2O.1/4HBr$ (percent): C, 59.23; H, 5.28; N, 6.91; Br, 24.64. Found (percent): C, 58.73; H, 5.02; N, 7.19; Br, 25.10.

EXAMPLE XXXII 2-(p-isobutoxyanilino)quinolizinium bromide (A) p-Isobutoxyacetanilide.—To a solution of p-acetamidophenol (45.0 g., 0.3 mole) and potassium hydroxide (20.0 g.) in 75% alcohol (600 ml.) was added dropwise isobutyl bromide (45.0 g., 0.33 mole). The stirred mixture was boiled under reflux for 8.0 hours. The solvent was then removed in vacuo from the reaction mixture and water (400 ml.) was added to the residual product. This solution was then extracted with ether (2× 200 ml.), the ether layers were washed with 5% aqueous sodium hydroxide (2× 100 ml.), dried over potassium hydroxide (anhydrous), and the ether was removed in vacuo giving 40.0 g. (70%) of pink waxy crystals. The product was used directly in Part B.

(B) p-Isobutoxyaniline.—(1) A solution of p-isobutoxyacetanilide (55.0 g., 0.29 mole) in 10% hydrochloric acid (600 ml.) was heated for 3.0 hours and then refrigerated overnight. The product of the chilled solution was removed by filtration and washed with ice water and petroleum ether to give 23.0 g. of off-white material.

(2) To a solution of p-isobutoxyaniline hydrochloride (15.0 g., 0.09 mole) in water (300 ml.) was added 10% aqueous sodium hydroxide solution (50 ml.) until the solution was strongly basic. The solution was extracted with ether (3× 150 ml.) and the organic layers were dried over anhydrous potassium carbonate. The ether was removed in vacuo and 11.0 g. (92%) of product were obtained, which was used directly in Part C.

(C) 2 - (p-isobutoxyanilino)quinolizinium bromide.—To a solution of 2-bromoquinolizinium bromide (10.0 g., 0.035 mole) in isopropanol (200 ml.) was added p-isobutoxyaniline (11.0 g., 0.065 mole). The stirred mixture was boiled under reflux for 4.0 hours. The reaction mixture was chilled in an ice bath, scratched, and treated with ether until crystallization began. The product was removed by filtration, washed with ether, and dried at 63° providing a total of 13 g. (100%). Recrystallization from isopropanol/ether (charcoal) provided a yellow powder melting at 160–162°.

*Analysis.*—Calcd. for $C_{19}H_{21}BrN_2O$ (percent): C, 61.13; H, 5.67; N, 7.51; Br, 21.41. Found (percent): C. 61.19; H, 5.83; N, 7.51; Br, 21.50.

What is claimed is:

1. A compound of the group consisting of those of the formula:

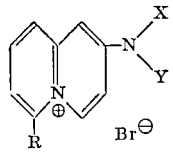

wherein:

R is hydrogen or methyl;
X is hydrogen, ethoxyethyl, amino or allyl; and
Y is hydrogen, ethoxyethyl, allyl, 2-(5-ethyl-2-pyridyl) ethyl, or

in which Z is 2-lower-alkoxy, 3,4-dimethoxy, 4-diloweralkylamino, 4-methylmercapto, 2,4-dimethoxy, 4-lower alkoxy, 4-allyloxy, 4-propynyloxy, 3,4-dimethyl, 2-methoxy-5-methyl, hydrogen, 2,4,6-trimethoxy, 4-phenoxy, 4-methoxy-2-methyl, 3-chloro, 5-chloro-2,4-dimethoxy, 3-(1-hydroxyethyl), 4-bromo, 2,5-diethoxy or 4-cyclopentyloxy; and the hydrobromide salts thereof.

2. The hydrobromide compound of claim 1 wherein R is hydrogen, X is amino and Y is 2-(5-ethyl-2-pyridyl) ethyl.

3. The hemihydrobromide compound of claim 1 wherein R is methyl, X is hydrogen and Y is 4-methoxyphenyl.

4. The compound of claim 1 wherein R is hydrogen and each of X and Y is ethoxyethyl.

5. The compound of claim 1 wherein R is methyl, X is hydrogen and Y is 3,4-dimethoxyphenyl.

6. The hydrobromide compound of claim 1 wherein R is hydrogen, X is hydrogen and Y is 4-dimethylaminophenyl.

7. The compound of claim 1 wherein R is methyl, X is hydrogen and Y is 4-methylmercaptophenyl.

8. The compound of claim 1 wherein R is methyl, X is hydrogen and Y is 4-ethoxyphenyl.

9. The compound of claim 1 wherein R is methyl and each of X and Y is allyl.

10. The tetartohydrobromide compound of claim 1 wherein R is methyl, X is hydrogen and Y is 2,4-dimethoxyphenyl.

11. The compound of claim 1 wherein R is hydrogen, X is hydrogen and Y is 2-methoxyphenyl.

12. The compound of claim 1 wherein R is hydrogen, X is hydrogen and Y is -ethoxyphenyl.

13. The tetartohydrobromide compound of claim 1 wherein R is hydrogen, X is hydrogen and Y is 4-allyloxyphenyl.

14. The hydrobromide compound of claim 1 wherein R is hydrogen, X is hydrogen and Y is 4-diethylaminophenyl.

15. The compound of claim 1 wherein R is hydrogen, X is hydrogen and Y is 4-propynyloxyphenyl.

16. The compound of claim 1 wherein R is hydrogen, X is hydrogen and Y is 3,4-dimethylphenyl.

17. The hemihydrobromide compound of claim 1 wherein R is hydrogen, X is hydrogen and Y is 2,4-dimethoxyphenyl.

18. The compound of claim 1 wherein R is hydrogen, X is hydrogen and Y is phenyl.

19. The compound of claim 1 wherein R is hydrogen, X is hydrogen and Y is 2,4,6-trimethoxyphenyl.

20. The tetartohydrobromide compound of claim 1 wherein R is hydrogen, X is hydrogen and Y is 4-phenoxyphenyl.

21. The compound of claim 1 wherein R is hydrogen, X is hydrogen and Y is 4-butoxyphenyl.

22. The compound of claim 1 wherein R is hydrogen, X is hydrogen and Y is 4-methoxy-2-methylphenyl.

23. The compound of claim 1 wherein R is hydrogen, X is hydrogen and Y is 4-propoxyphenyl.

24. The compound of claim 1 wherein R is hydrogen, X is hydrogen and Y is 5-chloro-2,4-dimethoxyphenyl.

25. The compound of claim 1 wherein R is hydrogen, X is hydrogen and Y is 3-(1-hydroxyethyl)phenyl.

26. The compound of claim 1 wherein R is hydrogen, X is hydrogen and Y is 4-bromophenyl.

27. The compound of claim 1 wherein R is hydrogen, X is hydrogen and Y is 2-methoxy-5-methylphenyl.

28. The compound of claim 1 wherein R is hydrogen, X is hydrogen and Y is 4-isopropoxyphenyl.

29. The compound of claim 1 wherein R is hydrogen, X is hydrogen and Y is 3,4-dimethoxyphenyl.

30. The compound of claim 1 wherein R is hydrogen, X is hydrogen and Y is 2-ethoxyphenyl.

31. The compound of claim 1 wherein R is hydrogen, X is hydrogen and Y is 2,5-diethoxyphenyl.

32. The tetartohydrobromide compound of claim 1 wherein R is hydrogen, X is hydrogen and Y is 4-cyclopentyloxyphenyl.

33. The compound of claim 1 wherein R is hydrogen, X is hydrogen and Y is 4-isobutoxyphenyl.

References Cited

FOREIGN PATENTS 389,617  7/1965  Switzerland.

HENRY R. JILES, Primary Examiner
A. L. ROTMAN, Assistant Examiner

U.S. Cl. X.R.

260—296; 424—263

PO-1050
(5/69)

UNITED STATES PATENT OFFICE
CERTIFICATE OF CORRECTION

Patent No. 3,517,019         Dated   June 23, 1970

Inventor(s)    Robert James Alaimo

It is certified that error appears in the above-identified patent and that said Letters Patent are hereby corrected as shown below:

Column 1, line 56, "diamethoxy" should read --dimethoxy--. Column 2, lines 12 to 21, the right-hand formula should appear as follows:

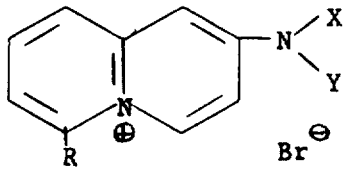

line 57, "is" should read --in--. Column 3, line 53, "sveral" should read --several--. Column 5, line 51, "diethyl-p-phenylenadiomine" should read --diethyl-p-phenylenediamine--; line 64, "hydroxyacetaniline" should read --hydroxyacetanilide--; line 75, "propargyloxyacetaniline" should read --propargyloxyacetanilide--. Column 9, line 20, "pan" should read --panol--. Column 10, line 28, "boil" should read --oil--.

SIGNED AND
SEALED
NOV 3 1970

(SEAL)
Attest:

Edward M. Fletcher, Jr.
Attesting Officer

WILLIAM E. SCHUYLER, JR.
Commissioner of Patents